United States Patent [19]

Ray et al.

[11] 3,813,197
[45] May 28, 1974

[54] APPARATUS FOR MAKING AN ENDLESS POWER TRANSMISSION BELT

[75] Inventors: Robert L. Ray; William J. Champeau; Kerry D. McAtee, all of Springfield, Mo.

[73] Assignee: Dayco Corporation, Dayton, Ohio

[22] Filed: May 30, 1972

[21] Appl. No.: 257,496

[52] U.S. Cl. ............. 425/111, 425/129 R, 425/438, 249/152, 249/178, 249/180, 249/83
[51] Int. Cl. .......................... B29h 7/22, B29h 3/08
[58] Field of Search .......... 425/111, 28 B, 34 B, 51, 425/54, 57, 129, 438, 440, 441; 249/63, 83, 88, 142, 144, 150, 152, 153, 178, 180, 184; 264/229

[56] References Cited
UNITED STATES PATENTS

| | | | |
|---|---|---|---|
| 560,123 | 5/1896 | Doughty | 425/51 X |
| 2,244,842 | 6/1941 | Knowles | 425/186 |
| 2,381,395 | 8/1945 | Brown | 425/111 X |
| 3,373,460 | 3/1968 | Ladney | 249/152 X |
| 3,618,170 | 11/1971 | Owens | 249/184 X |
| 3,634,572 | 1/1972 | Richmond et al. | 425/28 B X |
| 3,687,413 | 8/1972 | Murfitt et al. | 425/186 |

FOREIGN PATENTS OR APPLICATIONS

| 23,565 | 7/1913 | Norway | 425/57 |
|---|---|---|---|
| 6,615,598 | 9/1967 | Netherlands | 425/28 B |

*Primary Examiner*—J. Spencer Overholser
*Assistant Examiner*—David S. Safran

[57] ABSTRACT

A molding apparatus and method for making an endless belt construction in an inverted position and having a precisely preloaded load-carrying section are provided. The apparatus employs a mold core defined by a plurality of movable L-shaped segments and means for applying radial forces against the segments in a plurality of spaced parallel planes perpendicular to a central axis therethrough to thereby move the segments radially outwardly and precisely position and hold such segments at a tension-applying location where their outer surfaces define a right circular cylindrical surface and the desired preloading on the load-carrying section.

8 Claims, 5 Drawing Figures

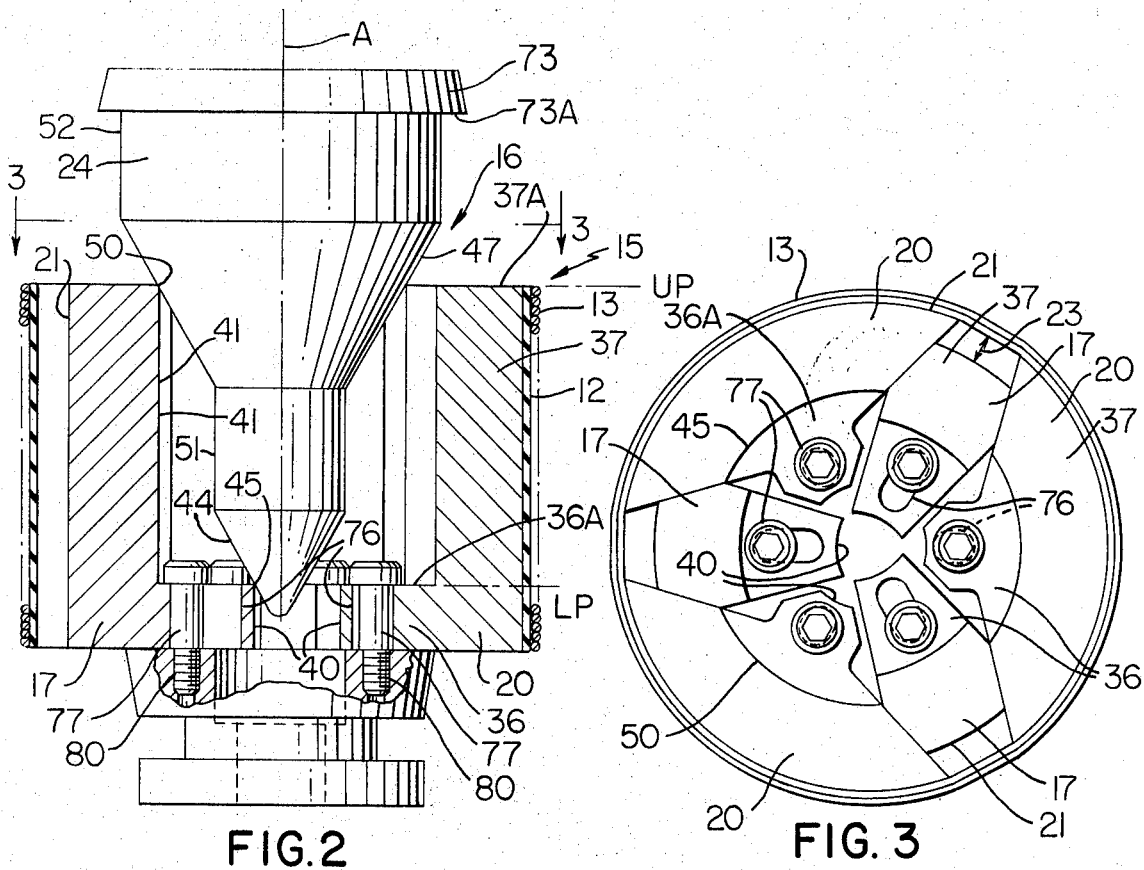
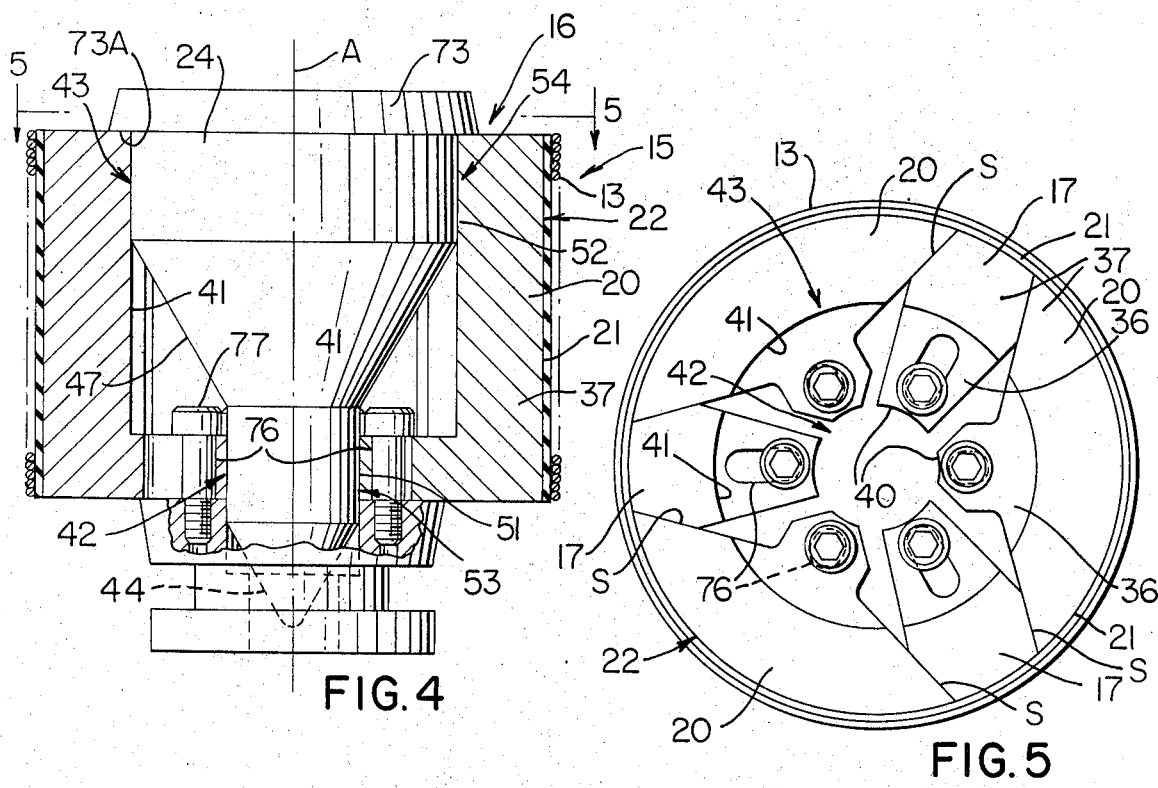

APPARATUS FOR MAKING AN ENDLESS POWER TRANSMISSION BELT

BACKGROUND OF THE INVENTION

It is known in the art to make endless power transmission belts in an inverted position and to preload the load-carrying section of each of these belts prior to molding a compression section thereagainst. However, the apparatus and methods proposed heretofore for making such belts are deficient because they do not provide satisfactory positioning and precise preloading of the load-carrying sections during introduction of elastomeric material used to make the compression sections of such belts, whereby the load-carrying section of each of these belts either moves during the introduction of elastomeric material and/or is not uniformly preloaded or tensioned across its entire width so that the completed belt provides poor performance.

SUMMARY

This invention provides an apparatus for and method of making an endless power transmission belt construction in an inverted position which overcomes the deficiencies of previous apparatus and methods and wherein such construction has a precisely preloaded load-carrying section. The apparatus and method employ a plurality of movable segments to define a radially expandable inner wall of a mold cavity against which a portion of a belt construction having a load-carrying section is installed whereupon means is employed for moving and holding the segments radially outwardly to precisely position such segments to a tension-applying location where the outside surfaces of the segments define a right circular cylindrical surface. The moving and holding means is used to apply radial forces against the segments in a plurality of spaced parallel planes arranged substantially perpendicular to a central axis through the segments to thereby preload such portion in a uniform and precise manner across its entire width and enable precision molding of an elastomeric material against such portion.

Other details, uses, and advantages of this invention will be readily apparent from the exemplary embodiments thereof presented in the following specification, claims, and drawings.

BRIEF DESCRIPTION OF THE DRAWINGS

The accompanying drawings show a present preferred embodiment of this invention, in which

FIG. 2 is a view with parts in cross section and parts in elevation particularly illustrating a mold core comprising the apparatus of FIG. 1 and a plurality of movable segments of such core moved radially inwardly with a portion of a belt construction having a load-carrying section which is to be precisely preloaded installed in position around such segments and also illustrating means in the form of a central core member for moving the segments radially outwardly to preload the load-carrying section;

FIG. 3 is a view with the central core member removed and taken essentially on the line 3—3 of FIG. 2;

FIG. 4 is a view similar to FIG. 2 illustrating the core member in position holding the segments radially outwardly, thereby preloading the portion of the belt construction; and FIG. 5 is a view similar to FIG. 3 also with the central core member removed and taken essentially on the line 5—5 of FIG. 4.

DESCRIPTION OF ILLUSTRATED EMBODIMENT

Figure 1:
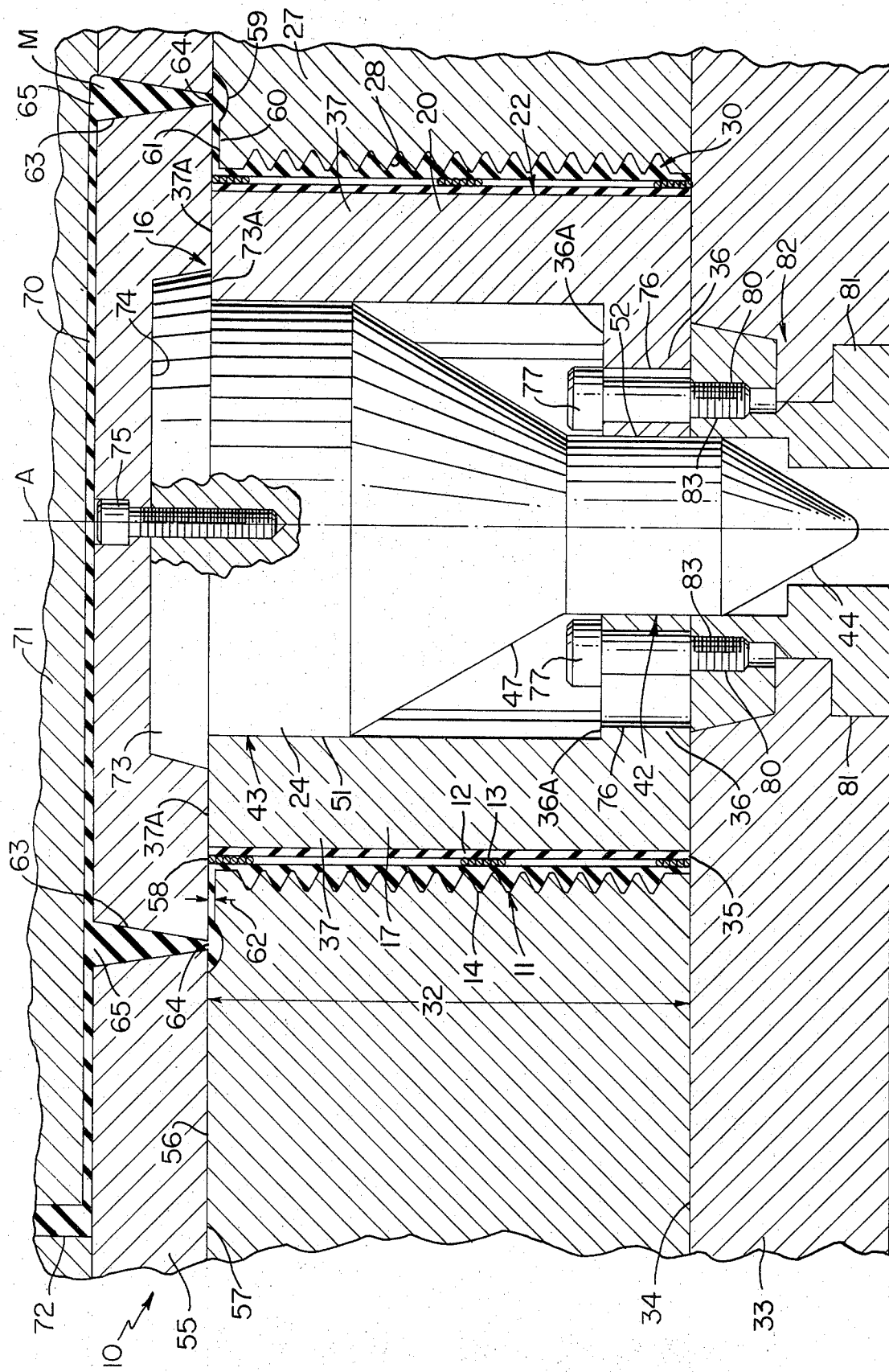
FIG. 1 is an enlarged, fragmentary, cross-sectional view illustrating one exemplary embodiment of the apparatus and method of this invention.

Reference is now made to FIG. 1 of the drawings which illustrates one exemplary embodiment of the molding apparatus and method of this invention and which is designated generally by the reference numeral 10 and is particularly adapted for making an exemplary endless power transmission belt construction 11 in an inverted position and such belt construction is in the form of a multiple-section V-belt construction 11; and, such belt construction is illustrated in the apparatus 10 just prior to removal from such apparatus and following curing of the belt construction in accordance with standard practice. The belt construction 11 comprises a tension section 12, a load-carrying section 13 which may be suitably bonded against or partially embedded within one end portion of the tension section 12, and a compression section 14 which is molded against the load-carrying section 13 once the load-carrying section has been precisely and uniformly preloaded utilizing the apparatus and method of this invention.

The tension section 12 is made of an elastomeric material having high resiliency and may be provided with an outer fabric cover (not shown) suitably impregnated with elastomeric material and such tension section and load-carrying section 13 are usually fixed together in accordance with techniques known in the art to define a unit or assembly which is designated generally by the reference numeral 15, see FIGS. 2 and 4. The load-carrying section 13 of the assembly 15 may be made of any suitable high-strength material capable of being preloaded and in this example such load-carrying section is made of an endless cord, also designated by the numeral 13, which is spirally wound and bonded against the tension section 12 whereupon the assembly 15 is placed in the apparatus 10 and the load-carrying section 13 precisely loaded, in a manner now to be described in detail, to enable molding of the compression section 14 against the load-carrying section 13.

The apparatus 10 comprises an expandable and contractable mold core which is designated generally by the reference numeral 16 having a central vertical axis A which is also the axis of the entire apparatus and a plurality of movable segments which in this example comprise six segments arranged in two sets having three smaller segments 17 in one of the sets spaced 120° apart and three larger segments 20 in the other set also spaced 120° apart. The segments 17 and 20 are movable radially inwardly and outwardly relative to the central axis A and have outside surfaces each designated by the same reference numeral 21 and the surfaces 21 cooperate to define a precision right circular cylindrical surface 22 in their outermost position as illustrated in FIG. 5.

The segments 17 and 20 are movable radially inwardly toward the axis A to a retracted position as illustrated in FIG. 3 and it will be seen that the segments 17 are movable radially inwardly a substantial distance as indicated at 23 to allow inward movement of the segments 20. With the segments 17 and 20 in the retracted position, a portion of the belt construction 11 in the form of assembly 15 may be easily installed in position therearound and as shown in FIGS. 2 and 3.

The apparatus 10 has means for moving and holding the segments 17 and 20 radially outwardly from the axis A to precisely position such segments and such moving and holding means is in the form of a central core member 24. The core member 24 precisely positions the segments 17 and 20 to a tension-applying location wherein their outside surfaces 21 cooperate to define the right circular cylindrical surface 22. Further, it is to be understood that each assembly 15 is suitably preformed and dimensioned such that once it is placed around segments 17 and 20 of the mold core 16 and the core member 24 utilized to move the segments 17 and 20 radially outwardly a precise tension or preload is exerted against the assembly 15 and in particular its load-carrying section 13 which will be substantially the same for each belt construction 11 made in the apparatus 10.

The apparatus 10 also includes an outer housing means or housing 27 which may be in the form of a plate and such housing is arranged and suitably supported in position concentrically around the core 16. The housing 27 has an inside surface 28 which has a substantially saw-toothed configuration and the surface 28 cooperates with the right circular cylindrical surface to define opposed walls of a mold cavity 30 in the apparatus 10.

The core member 24 is particularly adapted to apply radial forces in a plurality of spaced parallel planes, to be described subsequently, arranged substantially perpendicular to the axis A to thereby preload the assembly 15 in a uniform and precise manner across the entire width 32 thereof and enable introduction of a suitable elastomeric material M, see FIG. 1, into the mold cavity 30 for precision molding against the assembly 15. In particular, the core member 24 holds assembly 15 in position without slippage of any portion of the load-carrying section 13 and without high loads being applied at one location across the width 32 of the belt construction 11 and lesser loads at another location.

The apparatus 10 also comprises a bottom plate 33 having a top planar horizontal surface 34 and it will be seen that the segments 17 and 20 and the plate or housing 27 are supported on the surface 34. In addition the surface 34 and in particular an annular portion 35 thereof, once the segments 17 and 20 have been moved radially outwardly by the core member 24, defines a bottom wall which will also be referred to as bottom wall 35 for the mold cavity 30.

Each of the segments 17 and 20 has a substantially L-shaped cross-sectional configuration, see FIGS. 2 and 3, defined by a horizontally extending leg portion 36 which is supported on the horizontal surface 34 and a vertically extending leg portion 37 which is arranged substantially parallel to the axis A. Each leg portion 36 and 37 of each segment 17 and 20 has vertically extending arcuate surfaces defined by an arcuate surface 40 on the horizontal leg portion 36 and an arcuate surface 41 on the vertical leg portion 37, see FIG. 5, and the arcuate surfaces 40 and 41 are concave toward the central axis A. Each segment 17 and 20 has a substantially L-shaped cross-sectional configuration and inclined planar surfaces S defining opposite sides thereof. Once the core member 24 moves the segments 17 and 20 to the tension-applying location wherein the right circular cylindrical surface 22 is defined, the arcuate surfaces 40 on the horizontal leg portions 36 are arranged on a first common circumference indicated at 42 and the arcuate surfaces 41 on the vertical leg portions 37 are arranged on a second common circumference indicated at 43 which is larger than the first circumference.

The core member 24, which may be referred to as a plug 24, may be a solid member and has a lower cam surface in the form of a frustoconical surface 44 for engaging the top edge portions 45, see FIG. 2, of the horizontally extending leg portions 36 and applying radial forces in an associated lower horizontal plane designated LP which also coincides with the top coplanar surfaces 36A of the horizontal legs 36. The core member 24 also has an upper cam surface also in the form of a frustoconical surface 47 for engaging top edge portions 50 of the vertically extending leg portions 37 and applying radial forces in an associated upper horizontal plane designated UP which also coincides with the top coplanar surfaces 37A of the vertical leg portions 37.

The core member 24 also has a pair of vertically spaced right circular cylindrical surfaces 51 and 52 which are arranged concentric with the axis A. The surface 51 adjoins and extends between the large diameter end of frustoconical surface 44 and the small diameter end of frustoconical surface 47 while the surface 52 adjoins the large diameter end of the frustoconical surface 47. Once the cam surfaces 44 and 47 have moved the segments 17 and 20 to the precision tension-applying location defining right circular cylindrical surface 22, the core member is moved vertically downwardly along axis A so that its cylindrical surface 51 holds the arcuate surfaces 40 in position as shown at 53 in FIG. 4 and its cylindrical surface 52 holds arcuate surfaces 41 in position as shown at 54, whereby the segments 17 and 20 are held firmly in position by the substantial surface areas provided by surfaces 51 and 52 thereby assuring such segments will not collapse radially inwardly once the elastomeric material M is introduced into the mold cavity 30 to define the compression section 14.

The apparatus 10 also has a top plate 55, see FIG. 1, for the apparatus 10 which is arranged against the segments 17 and 20 and the housing 27 and in particular the top surfaces 37A of such segments and a top surface 56 of the housing 27. The plate 55 has a horizontal bottom surface 57 which has an annular portion 58 which defines a top wall for the mold cavity 30 once the segments 17 and 20 are expanded. The annular top wall 58 cooperates with the annular bottom wall 35 and the opposed walls 22 and 28 to define a completely enclosed mold cavity enabling introduction of elastomeric material M within such cavity under pressure and using conventional injection molding machines and techniques.

The apparatus 10 has an annular runner 59 which may be substantially semicircular in cross section and is provided in the housing 27 so that it extends downwardly from the top surface 56 of the housing 27 at the junction of such housing with the plate 55. The runner 59 is a continuous 360 degree runner which is arranged concentric with and outwardly of the cavity 30. The apparatus 10 also has an annular gate 60 which is provided in the housing 27 and in this example is defined between the bottom surface 57 of the plate 55 and an annular planar surface 61 in the inner edge portion of housing 27 which is spaced a vertical distance 62 beneath surface 57 and such distance defines the height of gate 60. The gate 60 extends between the runner 59 and the mold cavity 30 with the opposite ends of such gate communicating with the runner and mold cavity throughout their entire peripheries, i.e., gate 60 is an annular gate which also extends through 360°.

The apparatus 10 has a plurality of sprues 63 of substantially frustoconical configuration and such sprues have discharge ends 64 communicating with the runner 57 and inlet ends 65 in flow communication with associated supply means. In particular, the inlet ends 65 of sprues 63 communicate with a horizontal passage 70 defined between another plate 71 and the top plate 55 of injection molding apparatus 10. The passage 70 is supplied with elastomeric material M in a flowable condition through a supply passage 72 and from an injection molding machine of known construction.

The core member 24 of this example has a top cap 73 provided with an annular shoulder 73A which rests on the top surfaces 37A of the segments 17 and 20 and the plate 55 has a cutout 74 therein which is adapted to receive the cap 73. Further, although the core member 24 need not necessarily be fastened to the plate 55, in this example the top plate 55 and core member 24 are suitably fastened together by a threaded bolt 75 and with this type of construction the plate 55 may be provided with suitable pins, not shown, to enable precise centering of the top plate and hence the core member 24 relative to the outer housing 27 and bottom plate 33.

As seen particularly in FIGS. 2 and 3 of the drawings, each of the L-shaped segments 17 and 20 has an elongated opening 76 extending through its horizontal leg portion 36 and the opening 76 is arranged parallel to its vertical leg 37 (and hence the central vertical axis A) and is elongated substantially along a radial line or plane from the axis A. The apparatus 10 has a plurality of bolts 77 corresponding in number to the number of segments 17 and 20 and each bolt 77 is received through an associated elongated opening 76 and has a threaded end portion 80 threadedly received in the bottom plate 33. Each bolt 77 holds its segment with its vertical leg parallel to the axis A yet allows sliding movements of the horizontal leg 36 radially inwardly and outwardly on the horizontal surface 34.

The apparatus 10 has a plurality of detachable fastening members 81 which are suitably fixed to the bottom plate 33 and hence define an integral part thereof as illustrated at 82 in FIG. 1. The members 81 have threaded openings 83 therein which threadedly receive the threaded end portions 80 of the bolts 77; however, it will be appreciated that the plate 33 need not necessarily be provided with detachable members 81 and the bolts 77 may be threadedly received in threaded openings provided directly in plate 33 which may be defined as a single piece construction.

The apparatus 10 is preferably used with a conventional injection molding machine and the various components of the apparatus 10 are suitably keyed together and held in position in a standard press portion of such a machine. For example, the lower plate 33 and upper plate 55 may be suitably attached to associated heated platens of such press and such platens may be heated in any known manner. Therefore, it will be appreciated that the energy for expanding segments 17 and 20 is provided by such press. In particular, the press has suitable actuating means for its platens which urge plates 33 and 55 together to thereby move member 24 and plate 55 toward plate 33 causing radial expansion of segments 17 and 20.

Having described the detailed construction of the apparatus 10, a brief presentation will now be made of the unique method in which the power transmission belt 11 may be made in an inverted position and so that it has a precisely preloaded load-carrying section 13. In particular, it will be seen that the mold segments 17 and 20 are supported on the horizontal surface 34 of the bottom plate 33 and are moved or retracted radially inwardly toward a central axis A whereupon a portion of the belt construction 11, in the form of assembly 15, is installed in position around such retracted segments 17 and 20, as illustrated in FIG. 2 of the drawings.

With the assembly 15 in this position, a suitable moving and holding means in the form of core member 24 is employed to apply radial forces against the segments 17 and 20 in a plurality of spaced parallel planes arranged substantially perpendicular to the axis A. In this example, radial forces are applied in two horizontal planes arranged in spaced parallel relation and designated LP and UP by moving the core member 24 vertically downwardly using the previously mentioned standard press to apply vertical forces against plate 55 and hence member 24 causing the segments 17 and 20 to be expanded radially outwardly by frustoconical cam surfaces 44 and 47 and define a right circular cylindrical surface 22 whereby the assembly 15 is preloaded a precise amount as determined by the construction of the assembly 15 and the surface 22. Once the surface 22 is defined the core member 24 drops to its lowermost position, shown in FIGS. 1 and 4, and the surfaces 51 and 52 hold the segments precisely in position at opposite ends of the width 32 of the belt construction 11.

The elastomeric material M may then be injected under pressure through passages 72 and 70, sprues 63, runner 59, and gate 60 into the mold cavity 30 to define the compression section 14 directly against the precisely preloaded load-carrying section 13 comprising the assembly 15. The material in the cavity 30 is suitably cured and cooled whereupon the top plate 55 with the core member 24 attached thereagainst is lifted out of position by the press relieving the loading applied by segments 17 and 20 on the completed belt construction and allowing such segments 17 and 20 to be collapsed radially inwardly. The housing or plate 27 with the completed belt construction 11 in position may then be lifted away from the bottom plate 33 and segments 17 and 20 whereupon the belt construction 11 may be collapsed within the housing 27 and removed. The elastomeric material M which would normally solidify in the gate 60, runner 57, sprues 63, and passages 70-72 is then removed and the operation is repeated to define another belt construction 11.

Any suitable elastomeric material M whether in the form of a natural or synthetic rubber compound or a plastic, such as a polymer, may be used with the apparatus and method of this invention.

In addition, the apparatus and method 10 may be used to make a belt construction other than a multiple section V-belt construction. For example, the belt construction 11 may be suitably modified and the individual V-belt portions suitably cut to define single element or single section V-belts.

While present exemplary embodiments of this invention, and methods of practicing the same, have been illustrated and described, it will be recognized that this invention may be otherwise variously embodied and practiced within the scope of the following claims.

What is claimed is:

1. An apparatus for making an inverted endless power transmission belt construction having a precisely preloaded load-carrying section, said apparatus comprising; a mold core having a central axis and a plurality of moveable segments which are moveable radially inwardly and outwardly and have outside surfaces which cooperate to define a precision right circular cylindrical surface, said segments being moveable radially inwardly toward said axis to a retracted position to enable installation of a portion of said belt construction therearound, means for moving and holding said segments radially outwardly from said axis to precisely position said segments to a tension-applying location wherein their outside surfaces define said right circular cylindrical surface; an outer housing supported in position concentrically around said core and having an inside surface which cooperates with said right circular cylindrical surface to define opposed walls of a mold cavity; said moving and holding means applying radial forces against said segments in a plurality of spaced parallel planes arranged substantially perpendicular to said axis to thereby preload said portion of said belt construction in a uniform and precise manner across its entire width and enable introduction of an elastomeric material into said cavity for precision molding against said portion; a bottom plate having a top planar horizontal surface defining a bottom wall for said mold cavity, each of said segments and said housing being supported on said horizontal surface; each of said segments having a substantially L-shaped cross-sectional configuration defined by a horizontally extending leg portion supported on said horizontal surface and a vertically extending leg portion arranged substantially parallel to said axis; each leg portion of each of said segments having a vertically extending arcuate surface which is concave toward said axis, said moving and holding means having a pair of vertically spaced cylindrical surfaces which engage said arcuate surfaces and hold said segments at said tension-applying location, and at said location said arcuate surfaces on said horizontal leg portions are arranged on a first common circumference and said arcuate surfaces on said vertical leg portions are arranged on a second common circumference which is larger than said first circumference.

2. An apparatus for making an inverted endless power transmission belt construction having a precisely preloaded load-carrying section, said apparatus comprising; a mold core having a central axis and a plurality of moveable segments which are moveable radially inwardly and outwardly and have outside surfaces which cooperate to define a precision right circular cylindrical surface, said segments being moveable radially inwardly toward said axis to a retracted position to enable installation of a portion of said belt construction therearound, means for moving and holding said segments radially outwardly from said axis to precisely position said segments to a tension-applying location wherein their outside surfaces define said right circular cylindrical surfaces; an outer housing supported in position concentrically around said core and having an inside surface which cooperates with said right circular cylindrical surface to define opposed walls of a mold cavity; said moving and holding means applying radial forces against said segments in a plurality of spaced parallel planes arranged substantially perpendicular to said axis to thereby preload said portion of said belt construction in a uniform and precise manner across its entire width and enable introduction of an elastomeric material into said cavity for precision molding against said portion; a bottom plate having a top planar horizontal surface defining a bottom wall for said mold cavity, each of said segments and said housing being supported on said horizontal surface; each of said segments having a substantially L-shaped cross-sectional configuration defined by a horizontally extending leg portion supported on said horizontal surface and a vertically extending leg portion arranged substantially parallel to said axis; said moving and holding means comprising a central core member having a lower cam surface for engaging the top edge portions of said horizontally extending leg portions and an upper cam surface for engaging the top edge portions of said vertically extending leg portions, each of said cam surfaces applying radial forces in an associated horizontal plane upon moving said central member toward said plate.

3. An apparatus as set forth in claim 2 in which each of said cam surfaces comprises a substantially frusto-conical surface.

4. An apparatus as set forth in claim 2 and further comprising a top plate arranged against said segments and housing and defining a top wall for said mold cavity which cooperates with said bottom wall and said opposed walls to define a completely enclosed mold cavity enabling introduction of said elastomeric material therewithin under pressure.

5. An apparatus as set forth in claim 2 in which each of said L-shaped segments has an opening extending through its horizontal leg parallel to its vertical leg, said opening being elongated along a radial line from said axis, and further comprising a plurality of bolts corresponding in number to the said plurality of segments, each bolt being received through the elongated opening of an associated segment and having a threaded end threadedly received in said plate, each bolt holding its segment with its vertical leg parallel to said axis yet allowing sliding movements of its horizontal leg radially inwardly and outwardly on said horizontal surface.

6. An apparatus as set forth in claim 5 and further comprising a plurality of detachable fastening members fixed to said bottom plate and defining an integral part thereof, said members having threaded openings therein which threadedly receive said threaded ends of said bolts.

7. An apparatus as set forth in claim 2 in which said plurality of segments comprise a plurality of six segments arranged in two sets of three with the segments in each set being spaced 120° apart and the segments of one of said sets is moveable radially inwardly a substantial distance to allow radial inward movement of the segments of the other set to enable said installation of said portion of said belt construction therearound.

8. An apparatus as set forth in claim 7 in which said vertically extending leg portions of said segments have inclined planar surfaces defining opposite sides thereof, said planar surfaces of one segment cooperating with planar surfaces of adjoining segments and the outer edges of said planar surfaces coinciding with said right circular cylindrical surface.

* * * * *